United States Patent
Li et al.

(10) Patent No.: US 10,185,406 B2
(45) Date of Patent: Jan. 22, 2019

(54) INFORMATION TECHNOLOGY DEVICE INPUT SYSTEMS AND ASSOCIATED METHODS

(71) Applicant: OmniVision Technologies, Inc., Santa Clara, CA (US)

(72) Inventors: Jin Li, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 308 days.

(21) Appl. No.: 13/830,849

(22) Filed: Mar. 14, 2013

(65) Prior Publication Data

US 2014/0267033 A1    Sep. 18, 2014

(51) Int. Cl.
*G06F 3/033* (2013.01)
*G06F 3/0346* (2013.01)
*G06F 3/03* (2006.01)

(52) U.S. Cl.
CPC .......... *G06F 3/0346* (2013.01); *G06F 3/0304* (2013.01)

(58) Field of Classification Search
CPC ....... G06F 3/033; G06F 3/0346; G06F 3/0304
USPC .................................................. 345/156, 158
See application file for complete search history.

(56) References Cited

U.S. PATENT DOCUMENTS

| | | | | |
|---|---|---|---|---|
| 5,214,414 A | * | 5/1993 | Levine | G09G 5/08 345/157 |
| 5,559,943 A | * | 9/1996 | Cyr | G06F 3/0481 715/856 |
| 5,914,783 A | * | 6/1999 | Barrus | 356/614 |
| 6,184,863 B1 | * | 2/2001 | Sibert et al. | 345/156 |
| 6,515,689 B1 | * | 2/2003 | Terashima | 715/856 |
| 6,704,000 B2 | | 3/2004 | Carpenter | |
| 6,803,906 B1 | * | 10/2004 | Morrison | G06F 3/0428 178/18.01 |
| 7,852,315 B2 | * | 12/2010 | Ofek | G06F 3/0304 345/157 |

(Continued)

FOREIGN PATENT DOCUMENTS

EP    0907141 A1    4/1999

OTHER PUBLICATIONS

Taiwanese Patent Application 103106863 Office Action dated Jul. 27, 2015, 14 pages.

(Continued)

*Primary Examiner* — Benyam Ketema
(74) *Attorney, Agent, or Firm* — Lathrop Gage LLP (57) ABSTRACT

A method for generating a control signal to control an information technology device includes the following steps: (1) capturing, using an image sensor, a current control image of a light source of a remote controller positioned within a field of view of the image sensor; (2) identifying, within the current control image, a current location of light emitted from the light source; (3) determining movement between (a) the current location of the light emitted from the light source and (b) a previous location of the light emitted from the light source determined from a previously captured image; (4) generating a movement control signal based upon the movement; and (5) sending the movement control signal to the information technology device. The method is executed, for example, by a movement control module of an information technology device input system.

3 Claims, 5 Drawing Sheets

(56) References Cited

U.S. PATENT DOCUMENTS

| | | | |
|---|---|---|---|
| 8,237,655 B2* | 8/2012 | Yabe | G06F 3/017 345/157 |
| 2002/0036617 A1* | 3/2002 | Pryor | 345/156 |
| 2004/0207597 A1* | 10/2004 | Marks | 345/156 |

OTHER PUBLICATIONS

Taiwanese Patent Application 103106863 Office Action dated Nov. 20, 2015, 9 pages.

* cited by examiner

INFORMATION TECHNOLOGY DEVICE INPUT SYSTEMS AND ASSOCIATED METHODS

BACKGROUND

Input devices, such as keyboards, mice, trackballs, touchpads, and touchscreens, are commonly used to control information technology devices. For example, keyboards, mice, trackballs, and touchpads are often used to control personal computers. On the other hand, touchscreens are widely used to control mobile telephones and tablet computers.

Some conventional input devices enable remote control of an information technology device. For example, a wireless mouse may be used to control a computer workstation. A wireless mouse typically includes circuitry to detect user movement of the mouse, generate signals representing the detected movement, and wirelessly transmit the signals to a computer workstation. Although a wireless mouse may work well in situations where a user remains at a desk or similar platform, the mouse may be awkward to use in situations where the user is mobile.

For instance, consider a situation where a user wishes to interact with an audience in a room while presenting a computer-generated presentation. If the user were to use a wireless mouse to control the computer, the user would need to remain at a platform, such as a table or a podium, to control the mouse. Thus, use of the wireless mouse would restrict the user's freedom to move about the room and interact with the audience.

Another example of conventional remote control of an information technology device is found in U.S. Pat. No. 6,704,000 to Carpenter et al. Carpenter teaches positioning a cursor within a predefined distance of an optical point on a projected image. Carpenter's teachings, however, are only applicable to situations where an image is projected on a projection surface, such as a wall.

SUMMARY

In an embodiment, a method for generating a control signal to control an information technology device includes the following steps: (1) capturing, using an image sensor, a current control image of a light source of a remote controller positioned within a field of view of the image sensor; (2) identifying, within the current control image, a current location of light emitted from the light source; (3) determining movement between (a) the current location of the light emitted from the light source and (b) a previous location of the light emitted from the light source determined from a previously captured image; (4) generating a movement control signal based upon the movement; and (5) sending the movement control signal to the information technology device.

In an embodiment, an information technology device input system includes a remote controller including a light source, a processor, an image sensor for capturing a current control image of a field of view including the light source, a memory communicatively coupled to the processor for storing at least the current control image, and a movement control module. The movement control module includes machine readable instructions stored in the memory, that when executed by the processor, perform the functions of: (1) identifying, within the current control image, a current location of light emitted from the light source; (2) determining movement between (a) the current location of the light emitted from the light source and (b) a previous location of the light emitted from the light source determined from a previously captured image; (3) generating a movement control signal based upon the movement; and (4) sending the movement control signal to the information technology device.

In an embodiment, an information technology device includes a display for displaying an output image, a remote controller including a light source, a processor, an image sensor for capturing a current control image of a field of view including the light source, a memory communicatively coupled to the processor for storing at least the current control image, and a movement control module. The movement control module includes machine readable instructions stored in the memory, that when executed by the processor, perform the functions of: (1) identifying, within the current control image, a current location of light emitted from the light source; (2) determining movement between (a) the current location of the light emitted from the light source and (b) a previous location of the light emitted from the light source determined from a previously captured image; (3) generating a movement control signal based upon the movement; and (4) sending the movement control signal to the information technology device. The information technology device further includes a control subsystem adapted to control a position of a cursor on the output image at least partially based on the movement control signal.

DETAILED DESCRIPTION OF THE EMBODIMENTS

Disclosed herein are systems and methods for remote operation of information technology devices. Certain embodiments of the systems and methods disclosed herein achieve one or more advantages, as discussed below.

Figure 1:
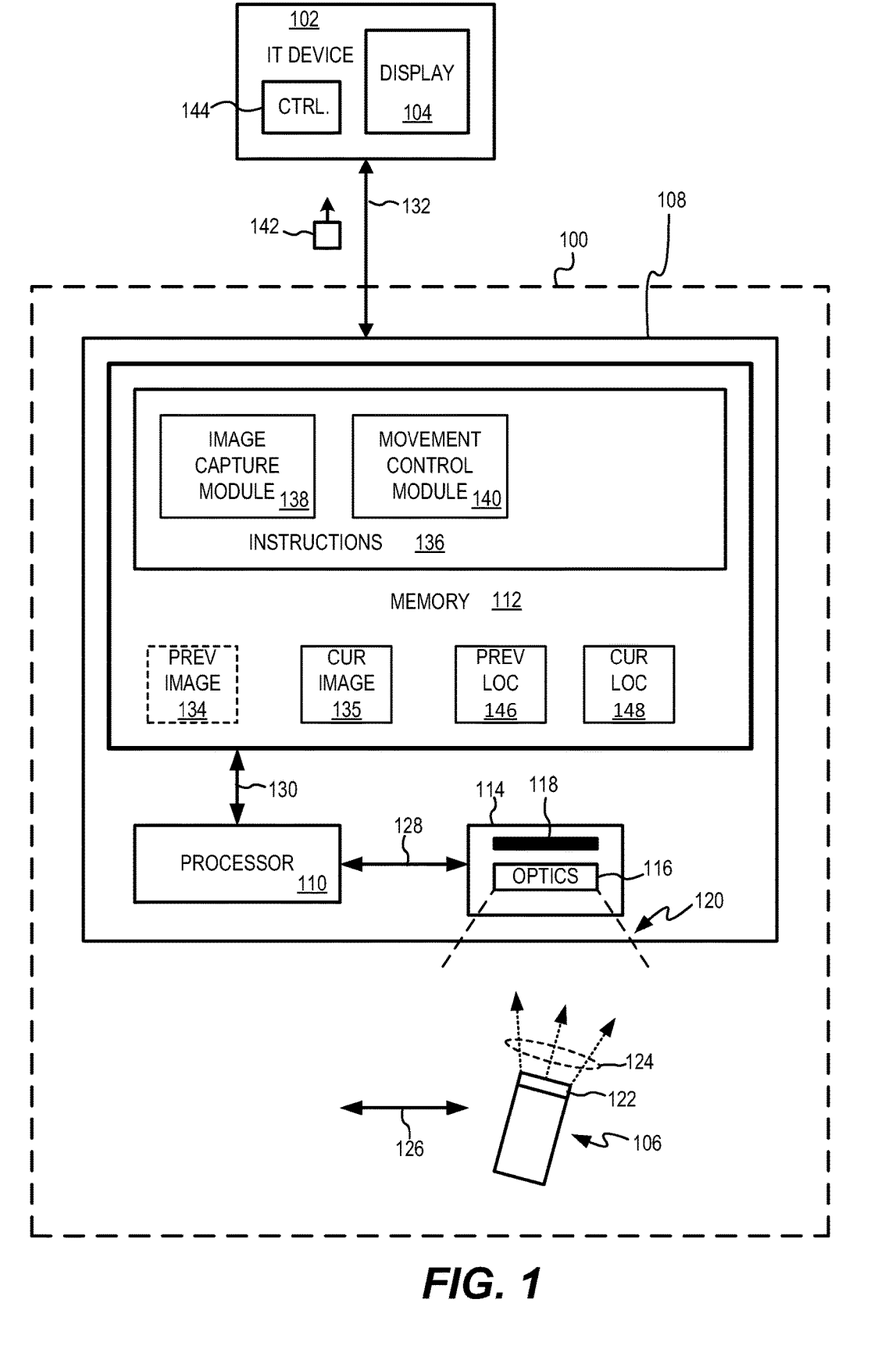
FIG. 1 shows one exemplary information technology device input system for remotely controlling an information technology device, according to an embodiment.

FIG. 1 shows one exemplary information technology device input system 100 for remotely controlling an information technology (IT) device 102. System 100 allows a user to remotely operate one or more aspects of IT device 102, for example. IT device 102 may represent one or more of a computing device, a television, a video display device, and/or a telecommunications device. IT device 102 includes a display 104 for displaying an output image. For example, in embodiments where IT device 102 is a personal computer, the output image is an image generated by the computer, such as a word processing document image when the computer is executing a word processing application. As another example, in embodiments where IT device 102 is a television, the output image is the television's video image (e.g., a menu of guide display).

System 100 includes a remote controller 106 and a receiver 108 that are not physically coupled together. Receiver 108 includes a processor 110, a memory 112, and an image sensor 114. Image sensor 114 may include wide angle optics 116 to focus incident light onto a two-dimensional photosensitive array 118 (e.g., a two-dimensional array of pixels), such that image sensor 114 has a wide field of view 120. In certain embodiments, optics 116 may be omitted to reduce system cost and/or complexity. Image sensor 114 and field of view 120 are substantially static to detect movement of remote controller 106.

Remote controller 106 includes a light source 122 for emitting light 124 over a wide angle that increase likelihood of light 124 being detected by image sensor 114 when remote controller 106 is within field of view 120. In certain embodiments, light source 122 emits infrared light to prevent distraction of a human in the vicinity of system 100. Such distraction might occur if emitted light 124 were within the human visible range of the electromagnetic spectrum. Remote controller 106 is typically powered from one or more energy sources (not shown), such as batteries, incorporated in controller 106.

Communication links 128, 130 communicatively couple image sensor 114, processor 110, and memory 112, and communication link 132 communicatively couples receiver 108 and IT device 102. Communication links 128 and 130 are, for example, electrical or optical data busses, and communication link 132 includes one or both a wired and wireless communication methodology. Although image sensor 114, processor 110, and memory 112 are shown as discrete elements, one or more of these elements may be combined. For example, in one embodiment, image sensor 114, processor 110, and memory 112 are combined within a single integrated circuit chip.

In an alternate embodiment, one or more of image sensor 114, processor 110, and memory 112 are shared with IT device 102, wherein system 100 uses components of IT device 102 to implement functionality and operability of system 100. For example, software of system 100 may be loaded and executed by a processor of IT device 102 to provide at least part of the functionality of system 100.

Image sensor 114, under the command of processor 110, periodically captures images of field of view 120. For example, successive control images of field of view 120 including light source 122 of remote controller 106, are captured by image sensor 114, and one or more of these images are stored within memory 112. As a user moves, as indicated by arrow 126, remote controller 106 within field of view 120, system 100 detects this movement and generates a movement control signal 142 to control IT device 102. It should be understood that control images captured by image sensor 114 are different from any output images that might be displayed on IT device display 104.

Memory 112 is, for example, one or more of volatile random access memory, non-volatile random access memory, read only memory, a magnetic data storage disk, an optical storage disk, and other types of storage medium. Processor 110 reads and executes machine readable instructions 136, stored in memory 112, to control one or more aspects of system 100. Although processor 110 is shown as a single device, such as a microprocessor, processor 110 may also represent multiple processors.

Figure 2:
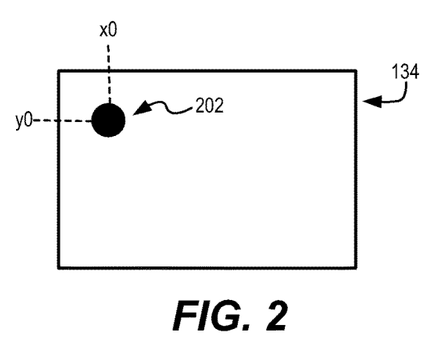
FIGS. 2 and 3 show examples of previous and current control images, respectively.
Figure 3:
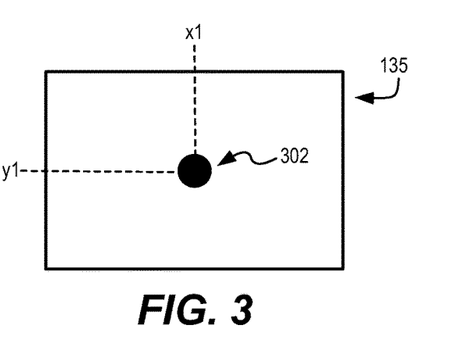

Instructions 136 include an image capture module 138 and movement control module 140. The instructions of image capture module 138, when executed by processor 110, control image sensor 114 to periodically capture and store control images of field of view 120. In one embodiment, previous and current control images 134, 135 are stored within a cyclic buffer implemented within memory 112, where current control image 135 is captured a predetermined amount of time after previous control image 134. In another embodiment, only current control image 135 is stored in memory 112. FIGS. 2 and 3 show exemplary previous and current control images 134 and 135, respectively. Control images 134 and 135 include respective light spots 202, 302 representing light 124 detected by sensor 114 and corresponding to a position of light source 122 within field of view 120.

The instructions of module 140, when executed by processor 110, process control images to (a) identify a location of detected light 124 therein, (b) determine movement of the location between successive control images, and (c) generate a movement control signal 142 based upon the determined movement of the light to control IT device 102 via communication link 132. Accordingly, IT device 102 may be controlled by a user moving remote controller 106 within field of view 120.

Figure 4:
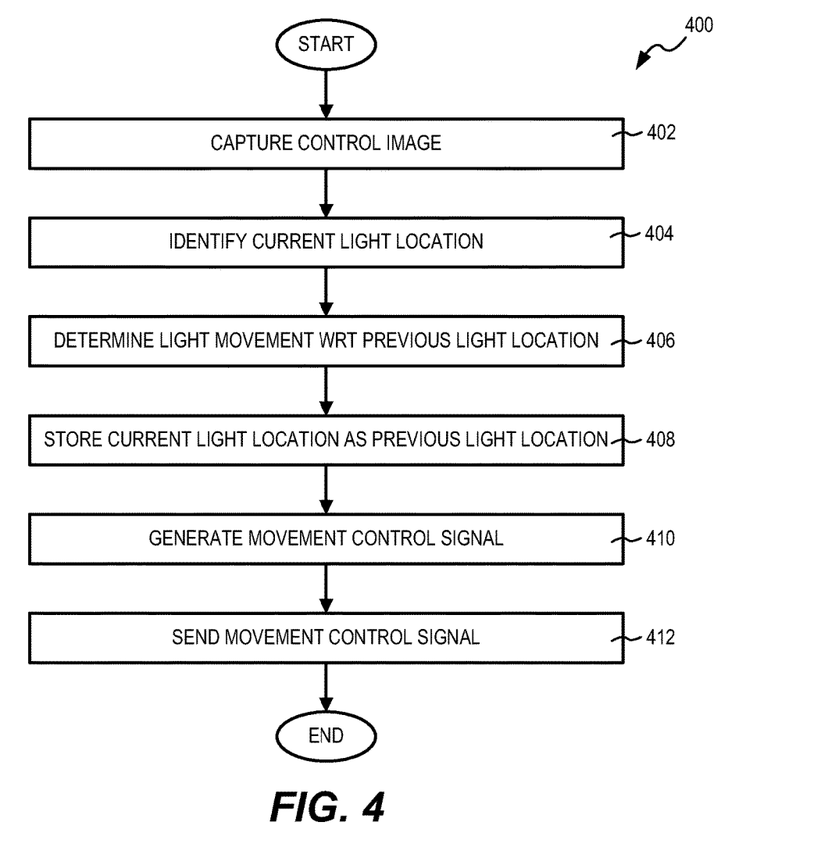
FIG. 4 shows one exemplary method for generating a control signal for an information technology device, using the system of FIG. 1, according to an embodiment.

FIG. 4 shows one exemplary method 400 for generating a control signal 142 for an information technology device using system 100. In step 402, a current control image is captured while remote controller 106 emits light 124 within field of view 120. In one example of step 402, processor 110 executes instructions of module 138 to control image sensor 114 to capture current control image 135 of field of view 120.

In step 404, a location of light 124 in the image captured in step 402 is identified, and the location is stored as current location 148. In one example of step 404, processor 110 executes the instructions of module 140 to (a) determine that light 124 is detected at coordinates (x1, y1) in current control image 135, (b) store coordinates (x1, y1) as current location 148.

Figures 5, 6:
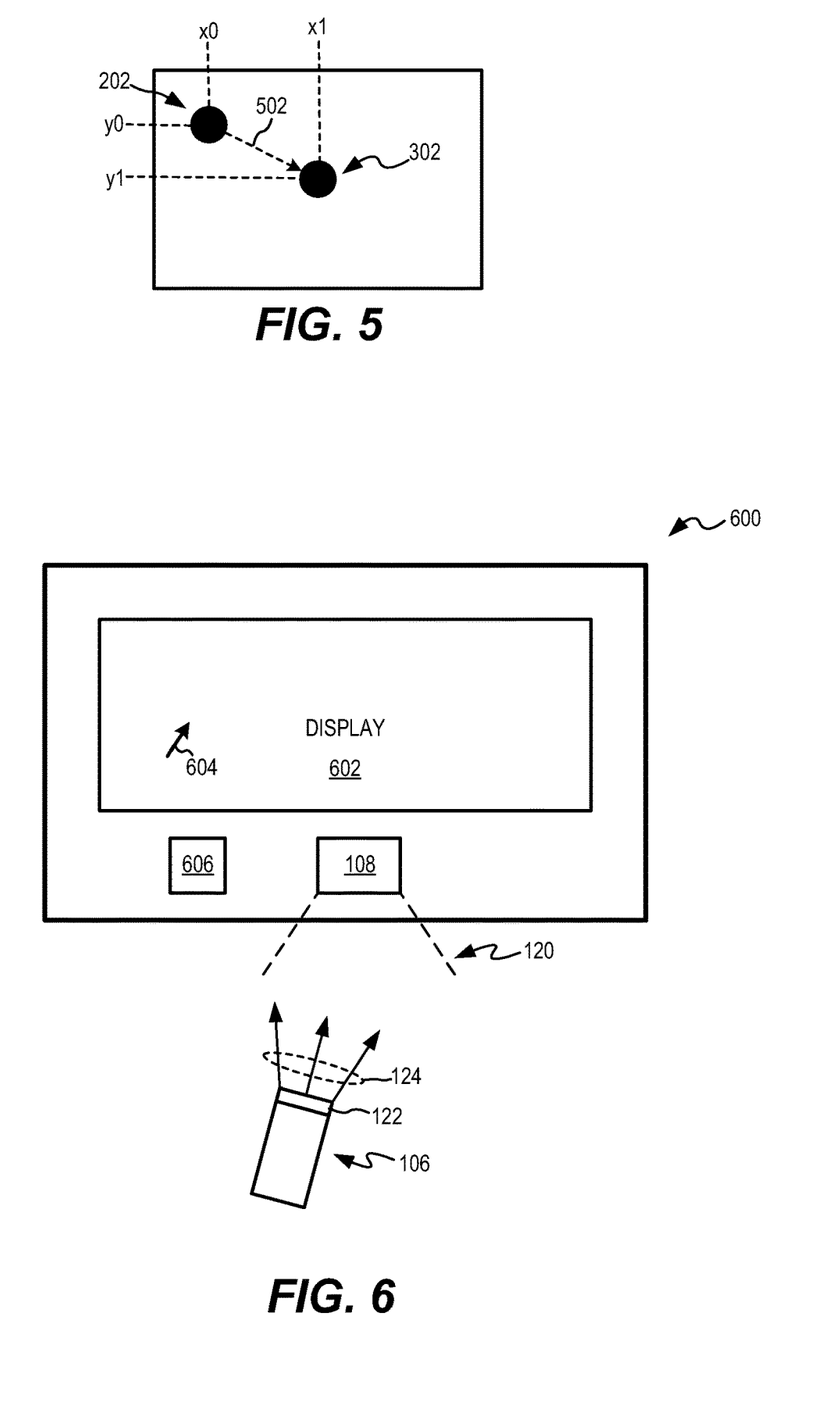
FIG. 5 shows a superposition of the previous and current control images of FIGS. 2 and 3, respectively, to illustrate determination of movement of a remote controller.
FIG. 6 illustrates one possible application of the FIG. 1 system in an information technology device, according to an embodiment.

In step 406, movement between current location 148 of light 124 and a previous location 146 of light 124 is determined. Previous location 146 stores a location of light 124 previously determined from a control image captured by image sensor 114 prior to capture of image 135 in step 402. In one example of step 406, previous location 146 stores coordinates (x0, y0) to represent the location of light 124 within previous control image 134, and processor 110 executes the instructions of module 140 to determine a vector 502 representing movement of detected light 124 between current and previous locations (x0, y0) and (x1, y1). Vector 502 is illustrated in FIG. 5, which is a superposition of previous and current control images 134, 135 for purposes of description. Changes (i.e., vector 502) in determined location 148 of the detected light 124 between successive control images 135 represent movement of remote controller 106 within field of view 120, since light 124 is emitted by light source 122 of remote controller 106.

In step 408, current light location 148 is stored as previous light location 146. In one example of step 408, processor 110 executes the instructions of module 140 to store coordinates (x1, y1) as previous location 146.

In step 410, a movement control signal is generated, based upon the movement of the detected light as determined in step 406. In one example of step 410, processor 110 executes instructions of module 140 to generate movement control signal 142 to include at least a magnitude and a direction based upon vector 502. Optionally, movement control signal 142 is also based upon a period between each successively captured image 135.

In step 412, the movement control signal is sent to the information technology device. In one example of step 412, processor 110 executes instructions of module 140 to send movement control signal 142 from receiver 108 to IT device 102 via communication link 132.

Method 400 repeats periodically to generate movement control signal 142 to reflect movement (e.g., as indicated by arrow 126) of remote controller 106 within field of view 120 to provide continued control of IT device 102. Optionally, during, or prior to, a first run of method 400, previous location 146 may be initialized to a currently determined location of light 124 by executing steps 402, 404 and 408, for example.

In one example of use, a control subsystem 144 of IT device 102 receives and uses movement control signal 142 to control the position of a cursor on an output image of display 104. A user of system 100 does not need to be at a fixed platform, such as a table, when moving the cursor, since system 100 and method 400 do not rely on sensing movement of a device on a platform. Instead, the user simply moves 126 remote controller 106 to change the location of light source 122 within field of view 120, thereby the user has significant latitude of movement when controlling IT device 102. Indeed, the user may even control IT device 102 while actively interacting with an audience during a presentation. Additionally, system 100 does not require use of an image projection surface, in contrast to the conventional techniques taught by Carpenter et al in U.S. Pat. No. 6,704,000. Furthermore, in contrast with Carpenter's techniques, system 100 need not be collocated with a projection screen, thereby furthering flexibility in use of system 100 over the prior art.

FIG. 6 shows exemplary use of system 100 to control an information technology device 600 that includes a display 602. Receiver 108 is integrated with IT device 600 and positioned near display 602. For example, as shown in FIG. 6, receiver 108 may be located below display 602; however, receiver 108 may be positioned elsewhere without departing from the scope hereof. In one embodiment, display 602 is at least partially transparent to the wavelength of light 124, thereby enabling receiver 108 to be disposed behind display 602. Although receiver 108 is symbolically shown as a single element, its various constituent elements may be distributed throughout IT device 600.

IT device 600 includes a control subsystem 606 that operates to move a cursor 604 displayed on display 602 in response to movement control signal 142 from receiver 108. In one example of operation, system 100 repeatedly executes method 400 such that movement of remote control 106 within field of view 120 causes control subsystem 606 to move cursor 604 with a corresponding distance and direction.

Remote controller 106 may also include one or more input devices, such as a button, a trackball, a touchpad, and/or an accelerometer, wherein system 100 is adapted to also transmit signals generated from activation of these input devices to IT device 102.

Figure 7:
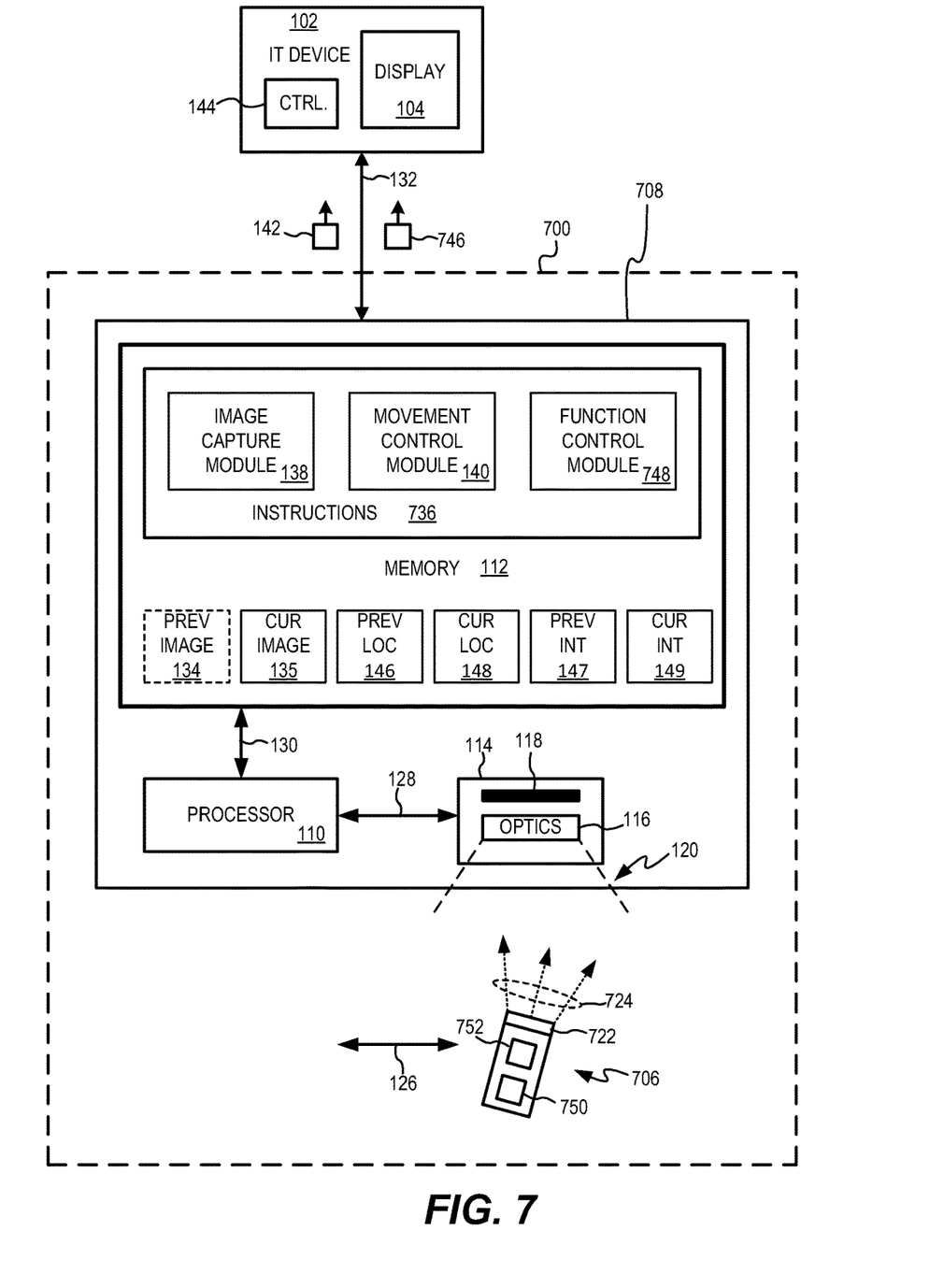
FIG. 7 illustrates another information technology device input system adapted to generate a signal for remotely controlling an information technology device, according to an embodiment.

FIG. 7 shows one exemplary information technology device input system 700 for remotely controlling IT device 102. System 700 is similar to system 100 of FIG. 1 and includes a remote controller 706 and receiver 708. Receiver 708 is similar to receiver 108 and further includes a function control module 748 in instructions 736, in addition to image capture module 138 and movement control module 140.

Remote controller 706 of system 700 is similar to remote controller 106 of system 100 and includes a light source 722 adapted to emit light 724 at a wide angle. Remote controller 706 further includes a button 750 for receiving additional input from a user. Remote controller 706 also includes circuitry 752, such as a processor and memory containing executable instructions. In one embodiment, circuitry 752 of remote controller 706 distinguishes between a single-click and double-click of button 750, where a single-click corresponds to the user activating button 750 once during a given period, while a double-click corresponds to the user activating button 750 twice during the given period, and is similar to operation of a conventional mouse. Circuitry 752 controls light source 722 to encode within light 724 information representing activation of button 750 by the user.

In one embodiment, activation of button 750 is encoded in emitted light 724 by toggling intensity of light source 722 between two or more different intensity values. For example, intensity of light source 722 may be toggled between zero intensity and one hundred percent intensity at a defined frequency and for a given time duration, to represent clicking of button 750. A single-click may be differentiated from a double-click by varying the frequency of intensity toggling, a number of times the intensity is toggled during a given period, and/or varying a length of time that the intensity is at a particular value. In an alternate embodiment, information representing activation of button 750 is instead transmitted to receiver 708 using a radio transmitter and known radio transmission techniques.

In one example of operation, circuitry 752 operates light source 722 at a constant intensity when button 750 is not activated. When circuitry 752 determines that the user has performed a single-click of button 750, circuitry 752 toggles intensity of light source 722 between high and low intensity values at a first frequency, and for a predefined duration. When circuitry 752 determines that the user has performed a double-click of button 750, circuitry 752 toggles the intensity of light source 722 between high and low intensity values at a second predefined frequency that is different from the first frequency, and for a predefined duration. The frequency of intensity modulation and duration of the modulation are selected based upon the period of image capture by receiver 108. That is, the image capture rate of receiver 108 should be sufficiently high to be able to detect the frequency of intensity change and duration thereof.

Function control module 748 includes instructions, that when executed by processor 110, decode activation of button 750 based upon intensity changes of light source 722 detected by image sensor 114. Specifically, the instructions of module 748 perform at least the following functions when executed by processor 110: detecting an intensity of light 724 in control images captured by image sensor 114, determining a change in intensity of light 724 between the successive control images, and generating a function control signal 746 based on the detected change in intensity of light 724. In one embodiment, image capture module 138 is configured within system 700 such that processor 110, when executing the instructions of module 138, controls image sensor 114 to capture control images at a frequency that is at least twice the frequency of intensity toggling of light source 722.

Function control signal 746 is not limited to representing activation of button 750, but may also indicate whether the activation was a single-click, double-click, or sustained activation of the button. Processor 110 sends function control signal 746, which is optionally stored in memory 112, to IT device 102 via communication link 132. IT device 102 is thereby controlled by function control signal 746 based upon the user clicking on button 750 of remote controller 806.

Figure 8:
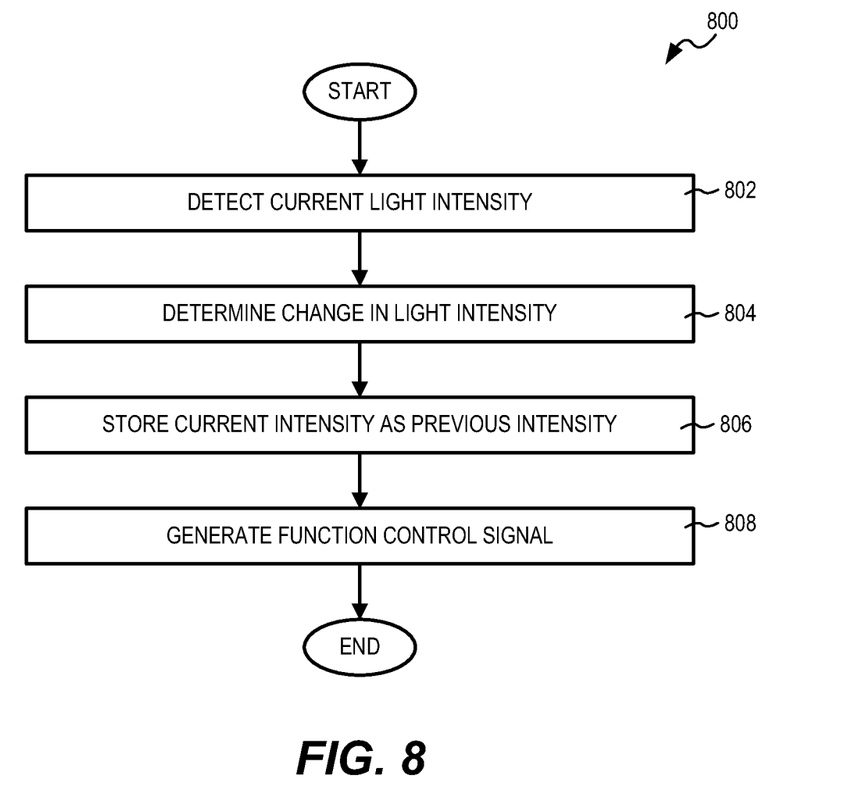
FIG. 8 shows one exemplary method for generating a control signal for an information technology device, using the system of FIG. 7, according to an embodiment.

FIG. 8 shows one exemplary method 800 for remote operation of an information technology device using system 700 of FIG. 7. Method 800 operates in sequence with method 400 of FIG. 4. For example, method 800 may be initiated after step 412 of method 400. In another example, steps of method 800 are interleaved with steps of method 400.

In step 802, a current intensity 149 of light emitted from the light source is detected within a current control image. In one example of step 802, processor 110 executes instructions of module 748 to detect an intensity of light spot 302, corresponding to intensity of light 724 detected by image sensor 114, in current control image 135. In step 804, a change in intensity of the light emitted from light source between (a) current intensity 149 and (b) a previous intensity 147 is determined and stored. Previous intensity 147 is an intensity of light 724 detected in a preceding control image captured by image sensor 114. In one example of step 804, previous intensity 147 is intensity of light spot 202 of previous control image 134, and processor 110 executes instructions of module 748 to determine and store a change in intensity between previous and current intensities 147, 149.

In step 806, current intensity 149 detected in step 802 is stored as previous intensity 147. In one example of step 806, processor 110 executes the instructions of module 748 to store the intensity of light spot 302 as previous intensity 147.

In step 808, a function control signal is generated to control the information technology device based upon at least the change in intensity of the detected light determined in step 804. In one example of step 808, processor 110 executes instructions of module 748 to generate function control signal 746, based at least in part, on a determined frequency of intensity change of the detected light over two or more successive control images.

Method 800 repeats periodically to generate function control signal 746 to reflect change in intensity of light 724 emitted from light source 722 within field of view 120, to provide continued control of IT device 102. Optionally, during, or prior to, a first run of method 802, previous intensity 147 is initialized, for example by executing steps 802 and 806. Alternatively, only during a first run of method 800, step 802 sets previous intensity to the determined current light intensity.

System 700 may be modified such that a signal representing clicking of button 750 is encoded in emitted light 724 by techniques other than, or in addition to, changing intensity of light 724. In one embodiment, light source 722 is a multi-color light source, and circuitry 752 signals clicking of button 750 by changing color of emitted light 724, wherein image sensor 114 is capable of sensing the color of light 724. In another embodiment, remote controller 706 includes a second light source (not shown), in addition to light source 722, that has different characteristics (e.g., different colors) from light source 722 that enable receiver 708 to differentiate between the two light sources. Circuitry 752 thereby controls the second light source to signal activation and deactivation of button 750.

Furthermore, button 750 could be supplemented by, or replaced with, one or more other input devices, such as another button, a trackball, a touchpad, and/or an accelerometer, without departing from the scope hereof. In these alternate embodiments, remote controller 706 is optionally adapted to encode emitted light 724 in response to activation of such alternate input devices. For example, in a certain embodiment including two buttons, remote controller 706 is operable to toggle intensity of light source 722 between two different values, at a frequency corresponding to which of the two buttons is clicked.

Combinations of Features

Features described above as well as those claimed below may be combined in various ways without departing from the scope hereof. The following examples illustrate some possible combinations:

(A1) A method for generating a control signal to control an information technology device may include the following steps: (1) capturing, using an image sensor, a current control image of a light source of a remote controller positioned within a field of view of the image sensor; (2) identifying, within the current control image, a current location of light emitted from the light source; (3) determining movement between (a) the current location of the light emitted from the light source and (b) a previous location of the light emitted from the light source determined from a previously captured image; (4) generating a movement control signal based upon the movement; and (5) sending the movement control signal to the information technology device.

(A2) The method denoted as (A1) may further include storing the current location of the light emitted from the light source as the previous location of the light emitted from the light source.

(A3) Either of the methods denoted as (A1) or (A2) may further include at least partially controlling the information technology device based upon the movement control signal.

(A4) The method denoted as (A3) may further include controlling a position of a cursor on an output image of the information technology device, based at least partially on the movement control signal.

(A5) In any of the methods denoted as (A1) through (A4), the light source may include an infrared light source.

(A6) In any of the methods denoted as (A1) through (A5), the image sensor may be integrated with the information technology device.

(A7) In any of the methods denoted as (A1) through (A6), the information technology device may be selected from the group consisting of a computing device, a television, and a telecommunications device.

(A8) Any of the methods denoted as (A1) through (A7) may further include the following steps: (1) detecting, within the current control image, a current intensity of the light emitted from the light source; (2) determining a change in intensity of the light emitted from the light source between (a) the current intensity of the light emitted from the light source and (b) a previous intensity of the light emitted from the light source; and (3) generating a function control signal to control the information technology device based at least partially on the change in intensity of the light emitted from the light source.

(A9) The method denoted as (A8) may further include detecting, within the previous captured image, the previous intensity of the light emitted from the light source.

(B1) An information technology device input system may include a remote controller including a light source, a processor, an image sensor for capturing a current control image of a field of view including the light source, a memory communicatively coupled to the processor for storing at least the current control image, and a movement control module. The movement control module may include machine readable instructions stored in the memory, that when executed by the processor, perform the functions of:

(1) identifying, within the current control image, a current location of light emitted from the light source; (2) determining movement between (a) the current location of the light emitted from the light source and (b) a previous location of the light emitted from the light source determined from a previously captured image; (3) generating a movement control signal based upon the movement; and (4) sending the movement control signal to the information technology device.

(B2) In the information technology device input system denoted as (B1), the light source may include an infrared light source and the image sensor may include an infrared detector.

(B3) Either of the information technology device input systems denoted as (B1) or (B2) may further include: (1) a controller configured with the remote controller to encode a state of an input button of the remote controller by varying the intensity of light emitted from the light source, and (2) a function control module. The function control module may include machine readable instructions stored in the memory, that when executed by the processor, perform the functions of: (1) detecting, within the current control image, a current intensity of the light emitted from the light source; (2) determining a change in intensity of the light emitted from the light source between (a) the current intensity of the light emitted from the light source and (b) a previous intensity of the light emitted from the light source; and (3) generating a function control signal to control the information technology device based at least partially on the change in intensity of the light emitted from the light source.

(B4) In any of the information technology device input systems denoted as (B1) through (B3), the information technology device may be selected from the group consisting of a computing device, a television, and a telecommunications device.

(B5) In any of the information technology device input systems denoted as (B1) through (B4), the image sensor may be integrated with the information technology device.

(C1) An information technology device may include a display for displaying an output image, a remote controller including a light source, a processor, an image sensor for capturing a current control image of a field of view including the light source, a memory communicatively coupled to the processor for storing at least the current control image, and a movement control module. The movement control module may include machine readable instructions stored in the memory, that when executed by the processor, perform the functions of: (1) identifying, within the current control image, a current location of light emitted from the light source; (2) determining movement between (a) the current location of the light emitted from the light source and (b) a previous location of the light emitted from the light source determined from a previously captured image; (3) generating a movement control signal based upon the movement, and (4) sending the movement control signal to the information technology device.

(C2) The information technology device denoted as (C1) may further include a control subsystem adapted to control a position of a cursor on the output image at least partially based on the movement control signal.

(C3) In either of the information technology devices denoted as (C1) or (C2), the light source may include an infrared light source and the image sensor may include an infrared detector.

(C4) In any of the information technology devices denoted as (C1) through (C3), the information technology device may be selected from the group consisting of a computing device, a television, and a telecommunications device.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for generating a control signal to control an information technology device, comprising:
    periodically capturing, using an image sensor, control images of a light source of a remote controller positioned within a field of view of the image sensor;
    identifying, within a previous control image, a previous location of light emitted from the light source;
    identifying, within a current control image, a current location of light emitted from the light source;
    storing the previous location and the current location in a memory such that the previous location and the current location are simultaneously retained in the memory;
    determining a vector representing movement between (a) the current location and (b) the previous location;
    generating a movement control signal including at least a magnitude and a direction, based upon the vector representing movement;
    sending the movement control signal to the information technology device;
    detecting, within the current control image, a current intensity of the light emitted from the light source;
    determining a change in intensity of the light emitted from the light source between (a) the current intensity of the light emitted from the light source and (b) a previous intensity of the light emitted from the light source; and
    generating a function control signal to control the information technology device based at least partially on the change in intensity of the light emitted from the light source.

2. A method for generating a control signal to control an information technology device, comprising:
    periodically capturing, using an image sensor, control images of a light source of a remote controller positioned within a field of view of the image sensor;
    identifying, within a previous control image, a previous location of light emitted from the light source;
    identifying, within a current control image, a current location of light emitted from the light source;
    storing the previous location and the current location in a memory such that the previous location and the current location are simultaneously retained in the memory;
    determining a vector representing movement between (a) the current location and (b) the previous location;
    generating a movement control signal including at least a magnitude and a direction, based upon the vector representing movement
    sending the movement control signal to the information technology device;
    detecting, within the current control image, a current intensity of the light emitted from the light source;
    determining a change in intensity of the light emitted from the light source between (a) the current intensity of the light emitted from the light source and (b) a previous intensity of the light emitted from the light source; and generating a function control signal to control the information technology device based at least partially on the change in intensity of the light emitted from the light source; and detecting, within the previous control image, the previous intensity of the light emitted from the light source.

3. An information technology device input system comprising:

a remote controller including a light source that includes an infrared light source;

a processor;

an image sensor for periodically capturing control images of a field of view including the light source, the image sensor including an infrared detector;

a memory communicatively coupled to the processor for storing (i) a previous location, within a previous control image, of light emitted from the light source, and (ii) a current location, within a current control image, of light emitted from the light source, such that the previous location and the current location are simultaneously retained in the memory;

a movement control module, including machine readable instructions stored in the memory, that when executed by the processor, perform the functions of:

identifying the current location, determining a vector representing movement between (a) the current location and (b) the previous location, generating a movement control signal including at least a magnitude and a direction, based upon the vector representing movement, and sending the movement control signal to the information technology device;

a controller configured with the remote controller to encode a state of an input button of the remote controller by varying the intensity of light emitted from the light source; and a function control module, including machine readable instructions stored in the memory, that when executed by the processor, perform the functions of:

detecting, within the current control image, a current intensity of the light emitted from the light source, determining a change in intensity of the light emitted from the light source between (a) the current intensity of the light emitted from the light source and (b) a previous intensity of the light emitted from the light source, generating a function control signal to control the information technology device based at least partially on the change in intensity of the light emitted from the light source.

* * * * *